(12) United States Patent
Feichtinger

(10) Patent No.: US 8,179,210 B2
(45) Date of Patent: May 15, 2012

(54) ELECTRICAL MULTILAYER COMPONENT WITH SHIELDING AND RESISTANCE STRUCTURES

(75) Inventor: Thomas Feichtinger, Graz (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 12/611,290

(22) Filed: Nov. 3, 2009

(65) Prior Publication Data

US 2010/0109804 A1    May 6, 2010

Related U.S. Application Data

(63) Continuation of application No. PCT/EP2008/055264, filed on Apr. 29, 2008.

(30) Foreign Application Priority Data

May 3, 2007 (DE) .......... 10 2007 020 783

(51) Int. Cl.
*H03H 7/00* (2006.01)
(52) U.S. Cl. ........................... 333/185; 333/175
(58) Field of Classification Search ........... 333/172, 333/185, 202, 204
See application file for complete search history.

(56) References Cited

U.S. PATENT DOCUMENTS

| | | | | |
|---|---|---|---|---|
| 4,302,362 A | * | 11/1981 | Hoffman et al. | 252/519.32 |
| 4,460,497 A | * | 7/1984 | Gupta et al. | 252/519.5 |
| 4,766,412 A | | 8/1988 | Takakura et al. | |
| 5,870,273 A | | 2/1999 | Sogabe et al. | |
| 6,376,085 B1 | | 4/2002 | Oobuchi et al. | |
| 6,608,547 B1 | | 8/2003 | Greier et al. | |
| 7,263,244 B2 | * | 8/2007 | Tanaka et al. | 385/2 |
| 7,443,267 B2 | * | 10/2008 | Saito et al. | 333/172 |
| 7,737,818 B2 | * | 6/2010 | Djordjevic et al. | 338/308 |
| 2002/0125547 A1 | | 9/2002 | Kawase et al. | |
| 2004/0061568 A1 | * | 4/2004 | Ishida et al. | 333/26 |
| 2006/0077646 A1 | | 4/2006 | Ahn et al. | |
| 2006/0215350 A1 | | 9/2006 | Tonogai et al. | |
| 2010/0014213 A1 | | 1/2010 | Wozniak et al. | |
| 2010/0157505 A1 | * | 6/2010 | Feichtinger et al. | 361/301.4 |

FOREIGN PATENT DOCUMENTS

| | | |
|---|---|---|
| DE | 37 17 157 A1 | 11/1987 |
| DE | 199 31 056 A1 | 1/2001 |
| DE | 100 26 258 A1 | 12/2001 |
| DE | 100 64 445 A1 | 7/2002 |
| DE | 102 24 564 A1 | 12/2003 |
| DE | 699 08 445 T2 | 5/2004 |
| DE | 103 56 498 A1 | 7/2005 |
| DE | 10 2004 045 009 A1 | 4/2006 |
| DE | 10 2005 025 680 A1 | 4/2006 |
| DE | 10 2005 050 638 A1 | 6/2007 |
| EP | 1 538 641 A2 | 6/2005 |
| JP | 11-340039 A | 12/1999 |
| JP | 2002-33634 A | 1/2002 |
| JP | 2002-118033 A | 4/2002 |
| JP | 2006-135141 A | 5/2006 |
| KR | 10 2005 0080823 A | 8/2005 |

* cited by examiner

*Primary Examiner* — Robert Pascal
*Assistant Examiner* — Kimberly Glenn
(74) *Attorney, Agent, or Firm* — Slater & Matsil, L.L.P.

(57) ABSTRACT

An electrical multilayer component includes a basic body having at least one stack of dielectric layers and electrode layers arranged alternately one above another. The component also includes an electrically non-connected shielding structure.

20 Claims, 3 Drawing Sheets

ELECTRICAL MULTILAYER COMPONENT WITH SHIELDING AND RESISTANCE STRUCTURES

This application is a continuation of co-pending International Application No. PCT/EP2008/055264, filed Apr. 29, 2008, which designated the United States and was not published in English, and which claims priority to German Application No. 10 2007 020 783.4 filed May 3, 2007, both of which applications are incorporated herein by reference.

TECHNICAL FIELD

An electrical multilayer component, in particular an electrical filter component is described.

BACKGROUND

DE 10 224 565 A1 discloses a multilayer component having a resistance structure.

SUMMARY

In one aspect, the invention specifies an electrical component which could have different electrical functions with little production-technological adaptation and in conjunction with a smallest possible size.

In a further aspect, the invention specifies an electrical component which, in conjunction with a smallest possible size, has a highest possible integration density relative to the switching elements of an electrical circuit integrated in the component.

What is specified is an electrical multilayer component comprising a basic body having a stack comprising dielectric layers and electrode layers arranged alternately one above another. It furthermore has an electrically non-connected shielding structure. Preferably, the electromagnetic shielding structure is surrounded entirely, that is to say from all sides, by dielectric materials. A particularly effective shielding function can thereby be manifested since the electromagnetic shielding structure is electrically non-connected both externally and internally. The shielding structure can be considered to be a metallic or a metal-containing layer, in particular, also a shielding electrode or a floating shielding electrode.

The electromagnetic shielding structure has the function of protecting specific regions of the multilayer component, for example, regions of the basic body having the stack, from being influenced by electromagnetic fields. In this case, the shielding structure could, by way of example, interrupt the variation of electromagnetic fields on account of stray capacitances or parasitic electromagnetic interference.

The electrical multilayer component preferably comprises a plurality of stacks of electrode layers, the stacks being arranged alongside one another. They can be arranged alongside one another in a lateral direction or in a vertical direction. A stack of electrode layers is formed by electrode layers arranged alternately one above another, in which case electrode layers which are arranged alongside one another and belonging to different stacks can be applied on a common dielectric layer. Consequently, the basic body comprises, for example, a single stack of continuous dielectric layers which are provided with electrode layers, if appropriate with different structures, at a plurality of locations in a lateral direction.

According to one embodiment, the multilayer component comprises external contacts, in which case each external contact can be contact-connected to electrode layers which bear a common electrical pole. In this case, the external contacts can be arranged at different external or side areas of the multilayer component. With the exception of the shielding structure, therefore, each electrode layer can be led out as far as the side area of the basic body.

In the case of a parallelepipedal basic body, by way of example, at least one external contact could be arranged at each of the four side walls of the basic body.

The multilayer component preferably comprises a resistance structure. The latter could, by way of example, be integrated in the basic body or applied at an external area of the basic body. The resistance structure can be part of an electrical filter which the electrical multilayer component comprises. In particular, the resistance can be embodied as part of an ESD filter, that is to say of an electrostatic discharge filter, or of an EMI filter, that is to say of an electromagnetic interference filter, or filter array.

The resistance structure is preferably formed by a resistance track, which can be embodied in meandering fashion, by way of example. At a respective end, the resistance structure is preferably contact-connected to an external contact, which, for its part, can be contact-connected to at least one electrode layer.

Preferably, in accordance with one embodiment of the multilayer component, the shielding structure is adjacent to the resistance structure in the stacking direction. However, it can also be spaced apart from the resistance structure by a plurality of layers, for example, dielectric and/or electrode layers.

It is preferred for the shielding structure to be arranged in the multilayer component where it shields a resistance present in the multilayer component from a part of the multilayer component. The part of the multilayer component could be, by way of example, the origin of stray fields or of electromagnetic fields. In accordance with one embodiment of the electrical multilayer component, it has a plurality of resistance structures. The latter can be arranged on an external area of the basic body. As an alternative, only one resistance structure is situated on the external area of the basic body; another is integrated in the basic body. A further embodiment provides for all the resistance structure to be integrated in the basic body. A plurality of resistance structures can be distributed on different planes over the height or stack height of the multilayer component. They can be arranged in each case on a dielectric layer of the stack.

The electromagnetic shielding structure is preferably adjacent to a resistance structure of the multilayer component in the stacking direction. This has the advantage that possible interference fields from regions on that side of the shielding electrode which is remote from the resistance structure are shielded over an area that is as large as possible. However, the shielding electrode can also be spaced apart from the resistance by means of a plurality of layers.

In accordance with one embodiment of the electrical multilayer component, the shielding structure is arranged in such a way that it protects an electrode layer from electromagnetic interference fields. In this case, it can likewise be adjacent to the electrode layer in the stacking direction.

It is provided, in particular, that the shielding structure is arranged between a resistance structure and an electrode layer of the multilayer component. The shielding structure can also be arranged between two electrode layers.

In accordance with one embodiment of the multilayer component, it has a ground electrode, to which signals of specific frequencies are conducted away. The ground electrode can interact with a plurality of electrode layers.

According to one embodiment, the electrical multilayer component comprises a capacitance which can be formed between two electrically differently polarized electrode layers and an intervening dielectric layer.

The dielectric layers of the multilayer component can contain a capacitor ceramic or a varistor ceramic. Depending on the use of one of the materials, the electrical multilayer component can comprise a capacitor or a varistor. Where a plurality of capacitances are produced between a plurality of electrode layers and dielectric layers, multilayer capacitors and/or multilayer varistors can respectively be produced.

A multilayer capacitor which the electrical multilayer component comprises has a stack of dielectric layers and electrode layers arranged alternately, one above another. In a lateral direction, the multilayer component comprises as an array preferably a plurality of multilayer capacitors arranged alongside one another, in which case the same dielectric layers of the basic body can be utilized for a plurality of multilayer capacitors. In an analogous manner, but using a varistor ceramic, a multilayer varistor or a multilayer varistor array could be produced.

In accordance with one embodiment of the electrical multilayer component, it comprises an ESD filter and/or an EMI filter. In this case, preferably two switching groups, each having at least one capacitance and at least one varistor, are connected in parallel between a signal input and a signal output. A resistance is connected between these switching groups. At high voltages, the resistance of the varistor becomes small and these signals can be conducted away via the ground electrode.

The capacitances, the resistance and also the varistor can be constructed in the manner already described. They can be interconnected as a Π filter.

A plurality of capacitances in the multilayer component can have the same or different capacitance values. The same analogously holds true for a plurality of resistances possibly present. Equality among capacitances or resistances could be achieved, by way of example, on the basis of a suitable material selection or on the basis of the setting in each case of the areas of electrode layers or resistance structures.

BRIEF DESCRIPTION OF THE DRAWINGS

The subject matter described will be explained in more detail on the basis of the following exemplary embodiments and figures, in which.

Figure 1A:
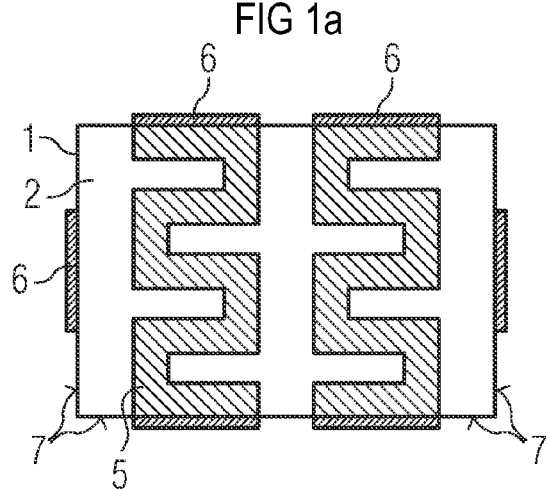
FIG. 1a shows a plan view of a section of a multilayer component with two meandering resistance structures.

The following list of reference symbols may be used in conjunction with the drawings:
  1 basic body
  2 dielectric layer
  3 electrode layer
  4 shielding electrode
  5 resistance structure
  6 external contact
  7 side areas of the basic body
  8 ground electrode
  A to F external contacts, illustrated schematically
  In1 first input line
  In2 second input line
  O1 first output line
  O2 second output line

DETAILED DESCRIPTION OF ILLUSTRATIVE EMBODIMENTS

FIGS. 1a to 1f show different layer views of a multilayer component having a plurality of stacks of electrode layers 3, the stacks being arranged laterally alongside one another. The latter are applied to common dielectric layers 2. The stacks of electrode layers produce, in interaction with the dielectric layers, capacitances connected in parallel. The latter can form a multilayer capacitor or a multilayer varistor depending on the use of a suitable dielectric material.

The multilayer component has preferably a plurality of external contacts 6, which can be arranged at different side areas 7 of the basic body 1. The external contacts 6 can be realized as electrically conductive layers applied to the external area of the basic body. According to one embodiment, the external contacts 6 embrace the basic body 1 by virtue of their being embodied right into the edge region of the end areas of the basic body 1. However, the external contacts 6 need not necessarily be embodied as layers; they can instead be embodied in pin-type fashion with a circular or semicircular cross section. They can contain a material which is used for electrode layers of the multilayer component. For the purpose of soldering to a printed circuit board or to a mounting area, the external contacts 6 can contain, at their sides remote from the basic body, a material which can be soldered to the printed circuit board or to the mounting area with the lowest possible electrical contact resistance.

FIG. 1a shows a plan view of a plane of the multilayer component in which a dielectric layer 2 is present. Two meandering resistance structures 5 are applied to the dielectric layer 2, the resistance structures being contact-connected to external contacts 6 in each case at both ends. The meandering resistance tracks 5 have the advantage over rectilinear resistance tracks that high resistances can be obtained in accordance with their comparatively long lengths.

Figure 1B:
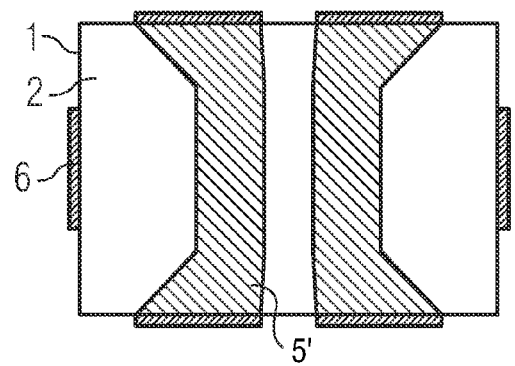
FIG. 1b shows a plan view of a section of a multilayer component with alternative resistance structures.

FIG. 1b shows a plan view of a plane of the multilayer component in which two areal resistance structures 5' are applied on a dielectric layer 2. The resistance structures are realized as resistance tracks whose widths are larger in the edge region of the dielectric layer 2 than in the inner region. They have tapering portions relative to their width. Such a construction has the advantage that contact resistances between the external contacts 6 and the resistance tracks 5' can be kept as small as possible.

Relative to the height of the multilayer component, the resistance structures lie at the topmost position in relation to the switching elements described below. In this case, they can be applied on the surface of the basic body 1 or be integrated in the upper region of the basic body. Moreover, resistance structures can be applied on both end areas of the basic body. However, they can be integrated on any other plane in the basic body. The resistance structures can be provided with one or a plurality of passivation layers, particularly when they are arranged on the surface of the basic body. The passivation layer preferably contains glass.

Figure 1C:
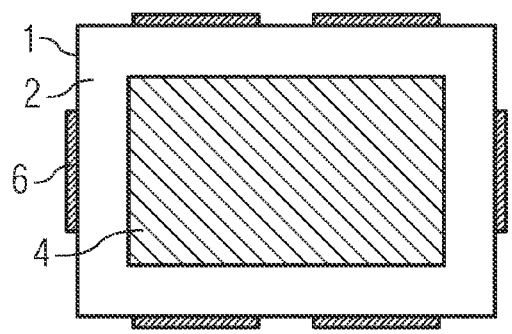
FIG. 1c shows a plan view of a section of a multilayer component with a shielding electrode.

FIG. 1c shows a plan view of a plane of the multilayer component which is preferably adjacent to the above-described resistance plane in the stacking direction. A dielectric layer 2 is shown, to which a floating shielding structure 4 is applied. The latter is surrounded by dielectric material altogether on account of the lack of contact-connection to the external contacts 6 or on account of the lack of contact-connection to any electrical contact and also on account of the lamination of the dielectric layer with an adjacent dielectric layer. The shielding structure 4 achieves an electromagnetic decoupling of the resistances or of the resistance structures from remaining parts, for example, from layers lying below them and also electrically active structures applied to the layers, of the multilayer component.

Figure 1D:
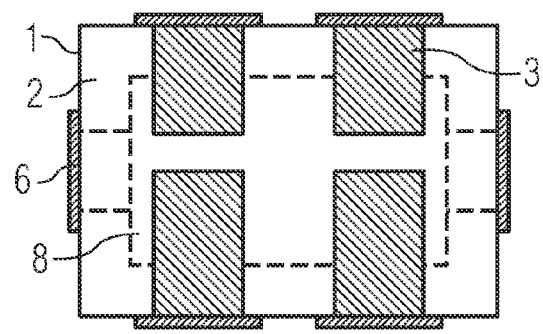
FIG. 1d shows a plan view of a section of a multilayer component with electrodes for producing capacitances and/or varistors.

FIG. 1d shows a plan view of a plane of the multilayer component in which four rectangular electrode layers 3 are arranged on a common dielectric layer 2. Each electrode layer 3 is connected by one end to an external contact 6, preferably arranged at a longitudinal side of the basic body 1. The electrode layers can have different lengths and widths. Electrode layers 3 which are contact-connected to external contacts 6 arranged on opposite side areas of the basic body can extend to different depths into the interior of the basic body. Each stack of electrode layers and dielectric layers arranged therebetween can form a multilayer capacitor or a multilayer varistor depending on the use of a suitable dielectric. It can correspondingly be inferred from the figure that the multilayer component has four multilayer capacitors and/or varistors. However, more than this number of multilayer capacitors and/or varistors can be formed, in which case a plurality of stacks of electrode layers which can be arranged onto common dielectric layers can be arranged alongside one another in a longitudinal direction of the multilayer component.

The multilayer component, with four multilayer capacitors in the manner described, could have an end area of less than 3 mm$^2$, preferably less than 2.5 mm$^2$. In this case, it is preferred for the multilayer component to have two resistance structures. In the case of eight multilayer capacitors, for example, the multilayer component has, for example, an end area of less than 6 mm$^2$, preferably less than 5.2 mm$^2$. It has proved to be expedient here if the multilayer component in this case has four resistance structures which are shielded from one another by means of shielding structures.

In particular, it has proved to be expedient if the number of resistance structures present in the multilayer component corresponds to half of the number of multilayer capacitors and/or varistors of the multilayer component or to half of the number of electrode layers applied on a common dielectric layer.

The structure shown by a dashed line in FIG. 1d represents a ground electrode 8, which will be described in more detail with the aid of the following figure.

Figure 1E:
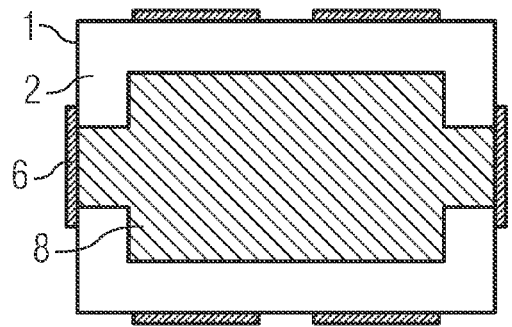
FIG. 1e shows a plan view of a section of a multilayer component with a ground electrode.

FIG. 1e shows a plan view of a plane of the multilayer component in which a ground electrode 8 applied to a dielectric layer 2 is present. The ground electrode 8 is connected to an external contact 6 at both ends. The ground electrode interacts with the plurality of electrode layers described above and is preferably adjacent to them in the stacking direction. It can have a structure that tapers outward from the inner portion, in particular, a cruciform structure. The ground electrode can interact with a plurality of multilayer capacitors and/or multilayer varistors or be led through the respective stacks thereof.

Figure 1F:
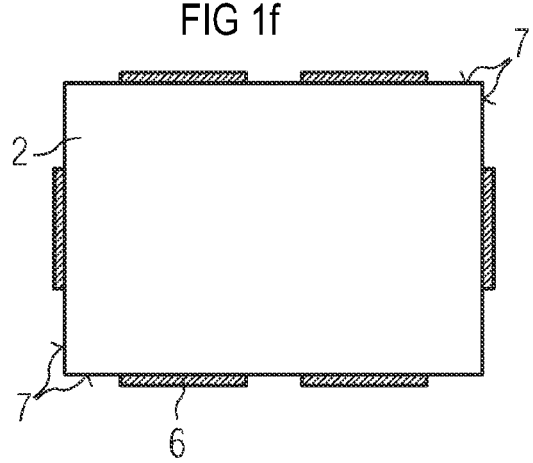
FIG. 1f shows a plan view of a section of a multilayer component with a dielectric layer.

FIG. 1f shows a plane of the multilayer component in which only one dielectric layer 6 is present. The latter could be arranged, for example, between dielectric layers having structured surfaces or, for example, at the underside of the basic body.

Figure 2A:
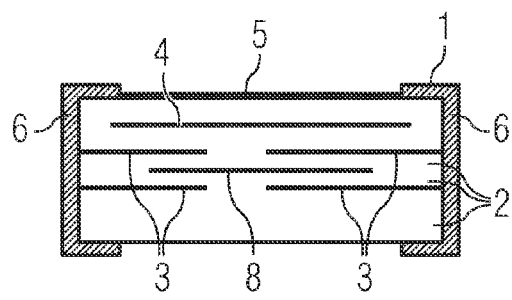
FIG. 2a shows a side view of a section of a multilayer component with a first layer construction.

FIG. 2a shows a first layer construction of an electrical multilayer component, in which a resistance structure 5 is arranged at an upper end area (relative to the mounting of the multilayer component onto a mounting area) of the basic body 1. The resistance structure 5 connects external contacts 6 which cover or embrace the basic body laterally, including the edges. Below the resistance structure, a shielding structure 4 is integrated in the basic body 1 and is adjacent to the resistance structure 5 in comparison with other electrically active structures of the multilayer component such as, for example, electrode layers or ground electrodes (but not dielectric layers). Situated at the closest location below the shielding structure 4, with the exception of a dielectric layer, there are two electrode layers 3 arranged on a common dielectric layer. A ground electrode 8 is present on the underlying plane of the multilayer component. Situated below the ground electrode there are again electrode layers 3 in the same arrangement as the electrode layers arranged further above.

Electrode layers 3 which are contact-connected to a common external contact 6 and interact with a counterelectrode (the ground electrode 8 in this case) form a first multilayer capacitor if a capacitor ceramic is used for the intervening dielectric layer, and a multilayer varistor if a varistor ceramic is used for the corresponding dielectric layer. Consequently, this example already shows two multilayer capacitors and/or multilayer varistors which lie opposite one another.

Figure 2B:
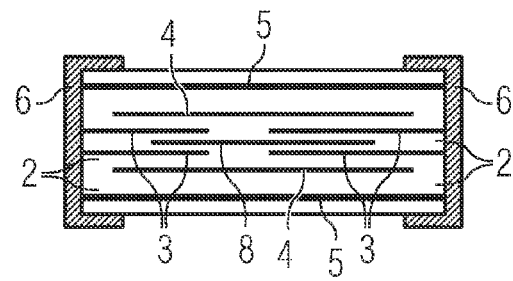
FIG. 2b shows a side view of a section of a multilayer component with a second layer construction.

FIG. 2b shows a further layer construction of an electrical multilayer component, in which, at the topmost location, a resistance structure 5 is integrated in the basic body. Arranged below that is a first shielding structure 4, followed by electrode layers 3 in an arrangement in accordance with the previous example. Arranged below the electrode layers 3 is a ground electrode 8 as counterelectrode, followed by further electrode layers 3. Below the last set of electrode layers 3, a second shielding structure 5 is integrated in the basic body. The second shielding structure is followed by one or a plurality of dielectric layers 2 forming the lower external area of the basic body.

A multilayer component comprising a shielding structure and at least one resistance can have the following layer construction, where n is an integer and the remaining numbers correspond to the reference symbols in the figures or the objects in the multilayer component that are shown by the reference symbols. The arrows show the order from layer to layer.

a) 5→4→3→8→3
b) 5'→4→3→8→3
c) 5→4→3→8→3→5
d) 5→4→3→8→3→4
e) 5→4→3→8→3→4→5
f) n×3→5→n×3→4→n×3→n×(3→8→3)
g) f)+n×3→4
h) g)+n×3→5→n×3

Figure 3A:
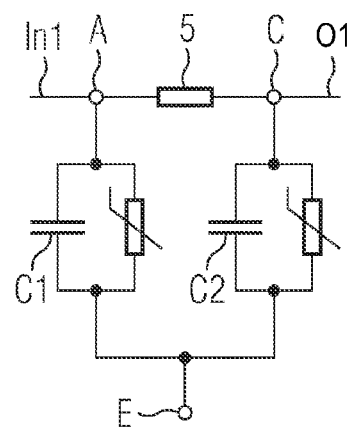
FIGS. 3a and 3b show circuit diagrams for illustrating the interconnection of switching elements of a multilayer component.
Figure 3B:
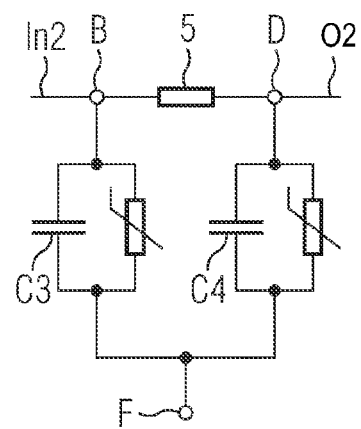
Figure 3C:
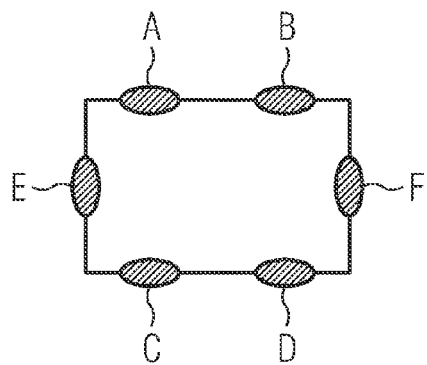
FIG. 3c shows a schematic illustration of the arrangement of external contacts of a multilayer component.

FIGS. 3a and 3b, and FIGS. 3b and 3c, should in each case be considered together. FIG. 3c schematically shows an arrangement of external contacts A to F of a multilayer component.

FIG. 3a shows a circuit diagram for a first pi filter, which forms a first part of a preferred ESD and/or EMI filter. The first Π filter comprises a first pair of electrode layers 3 which are arranged one above another and are contact-connected to the same external contact A. A second pair of electrode layers are arranged one above another and are contact-connected to external contact C lying opposite in comparison with the first pair of electrode layers. Dielectric layers and a common ground electrode 8 are arranged between both pairs of electrode layers arranged one above another. The ground electrode respectively forms a counterelectrode for the electrode pairs.

In FIG. 3a, the external contact A (also see FIG. 3c) is connected to In1, where In1 is an input line. In FIG. 3a, the external contact C (also see FIG. 3c) is connected to O1, where O1 is an output line.

Depending on the type of filter, the dielectric layers between the electrodes of the respective electrode pairs contain either a varistor ceramic or a capacitor ceramic. Consequently, a capacitance C1 arises between the first pair of electrode layers and the ground electrode. A further capacitance C2 arises between the second pair of electrode layers, lying opposite the first pair.

The external contacts A and C, or the input line In1 and the output line O1, are connected to one another by means of a resistance structure 5 that is preferably arranged at the surface of the basic body of the multilayer component. The resistance structure can have a value of between 90 and 110Ω, for example.

A Π filter formed in this way acts as a low-pass filter by virtue of the interaction of the capacitances C1 and C2 and the resistance structure 5 if voltages within a specific voltage value range are applied to the filter. The low-pass filter filters out possibly interfering high-frequency signal components. The application of higher voltages to the multilayer component leads, however, to the activation of a varistor effect if a varistor ceramic is used as dielectric material between the electrodes of the first and/or of the second electrode pair. In this case, the dielectric material, characterized per se by a high resistance value, becomes electrically conductive and conducts the signal accompanied by the high voltage away from the multilayer component via the ground electrode or via the external contact E connected to the ground electrode. A filter of the type described can be used for filtering out communication signals or noise signals and for conducting away overvoltages. In this case, the electrical multilayer component with its filter function is used, for example, as a hardware component in a mobile communication device and/or in a computer.

FIG. 3b shows a circuit diagram for a second Π filter, which forms a second part of a preferred ESD and/or EMI filter and is preferably connected in parallel with the first Π filter described. The second Π filter comprises a third pair of electrode layers 3, which are arranged one above another and are contact-connected to the same external contact B. A fourth pair of electrode layers 3 are arranged one above another and are contact-connected to external contact D lying opposite in comparison with the third pair of electrode layers. In this case, dielectric layers and also a common ground electrode 8 are arranged between both pairs of electrode layers arranged one above another. The ground electrode respectively forms a counterelectrode for the electrode pairs.

In FIG. 3b, the external contact B (also see FIG. 3c) is connected to In2, where In2 is a further input line. In FIG. 3b, the external contact D (also see FIG. 3c) is connected to O2, where O2 is a further output line.

Input lines and output lines can be embodied as conductor tracks on a printed circuit board.

Depending on the filter type, the dielectric layers between the electrode layers of the respective electrode layer pairs contain either a varistor ceramic or a capacitor ceramic. Consequently, a capacitance C3 arises between the third pair of electrode layers and the ground electrode. A further capacitance C4 arises between the fourth pair of electrode layers, lying opposite the third pair.

The external contacts B and D are connected to one another by means of a resistance structure 5 contained in the multilayer component. The resistance structure can have a value of between 90 and 110Ω, for example.

A second Π filter embodied in this way acts in the same manner as the first Π filter described above with the aid of FIG. 3a, in which case signals conducted away by means of a varistor effect are not conducted away via the external contact E, but rather this time via the external contact F.

First and third and also second and fourth electrode pairs can be arranged laterally alongside one another in the multilayer component.

Two Π filters are already integrated in a single multilayer component connected up in accordance with FIGS. 3a to 3c. Depending on the number of electrode layers and external contacts used, more Π filters could be integrated in the multilayer component. A component having a high integration density or having simple possibilities for high integration density is thus provided.

Instead of individual electrode pairs with a respective counterelectrode lying in between, this pattern could be repeated multiple times over the height of the multilayer component. Multilayer capacitors and/or multilayer varistors could then be produced as a result, in which case their contact-connection externally could still be effected by means of the external contacts already described.

The resistance structures can contain the following materials: $RbO_2$, $Bi_2Ru_2O_7$, C, $Ti_2N$, $LaB_6$.

Preferred materials contained in the electrode layers are Ag, Pd, Pt, AgPd alloys, AgPt alloys, Cu or Ni.

The dielectric layers of the multilayer component can contain as capacitor ceramic a material from the following capacitor ceramic classes: COG, X7R, Z5U, Y5V, HQM. These materials are suitable particularly when the electrical multilayer component is intended to have an EMI filter function.

The dielectric layers of the multilayer component can contain ZnO—Bi or ZnO—Pr as a varistor ceramic. These materials are suitable particularly when the electrical multilayer component is intended to have an EMI and/or an ESD filter function.

Figure 4:
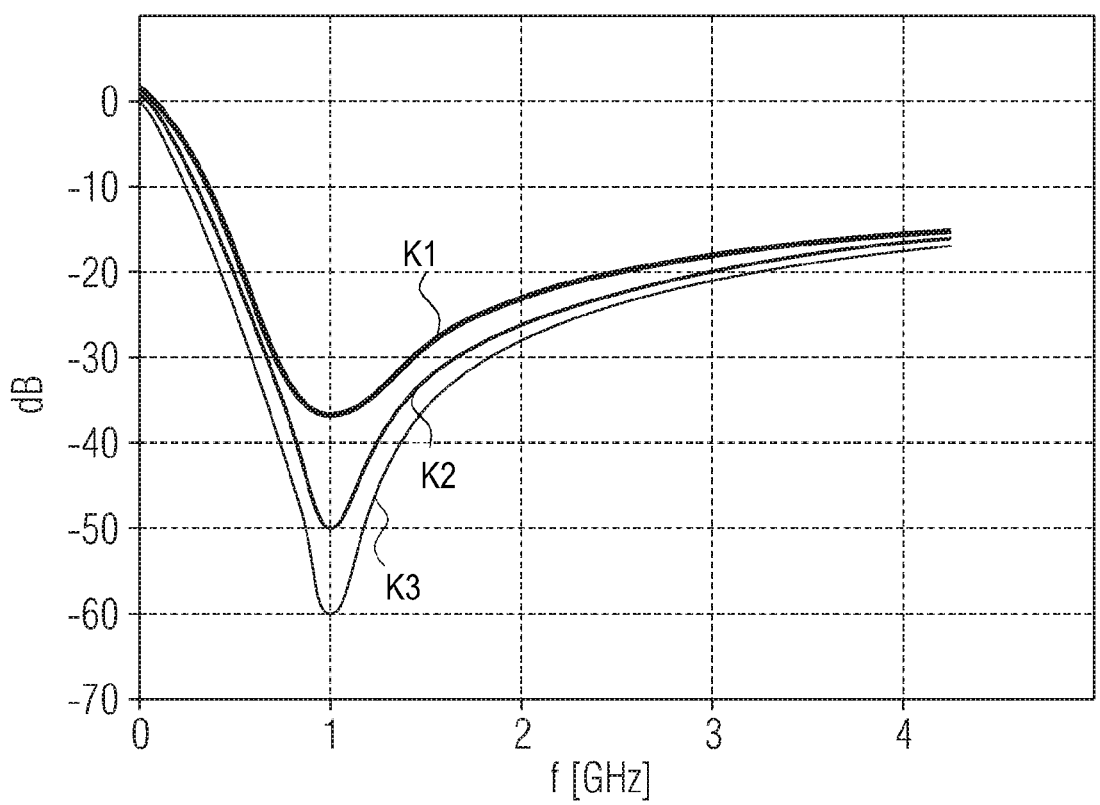
FIG. 4 shows a graph for illustrating different insertion losses of Π filters with and without an incorporated electromagnetic shielding structure.

FIG. 4 shows the insertion loss in dB of a multilayer component schematically for signals fed in, the frequencies of which in GHz are marked on the horizontal axis.

Curve K1 shows the insertion loss of a multilayer component having a Π filter interconnection, wherein the multilayer component has no shielding structure. Here, the maximum insertion loss is approximately −35 dB at a frequency of 0.95 GHz.

Curve K2 shows the insertion loss of a multilayer component having a Π filter interconnection, wherein the multilayer component has only one shielding structure arranged between two stacks of a plurality of electrode layers. Here, the maximum insertion loss is approximately −50 dB at a frequency of 1 GHz.

Curve K3 shows the insertion loss of a multilayer component having a Π filter interconnection, wherein the multilayer component has two shielding structures and two resistance structures shielded by the shielding structures. Here, the maximum insertion loss is approximately −60 dB at a frequency of 1 GHz.

An increase in the insertion loss of between 10 and 20 dB was achieved by means of each shielding structure additionally incorporated.

What is claimed is:

1. An electrical multilayer component comprising:
a basic body having at least one stack of dielectric layers and electrode layers arranged alternately one above another and an electrically non-connected shielding structure,
wherein the basic body has at least one resistance structure,
wherein the basic body has a ground electrode;
wherein the at least one resistance structure is arranged at a surface of the basic body, and
wherein the shielding structure is arranged between the resistance structure and one of the electrode layers.

2. The electrical multilayer component as claimed in claim 1, wherein the at least one stack of dielectric layers and electrode layers comprises a plurality of stacks of dielectric layers and electrode layers, the stacks being arranged laterally alongside one another.

3. The electrical multilayer component as claimed in claim 1, wherein the shielding structure comprises a metallic layer.

4. The electrical multilayer component as claimed in claim 1, wherein the at least one resistance structure comprises two resistance structures and wherein the shielding structure is arranged between the two resistance structures.

5. The electrical multilayer component as claimed in claim 1, wherein the at least one resistance structure contains at least one material selected from the group consisting of: $RbO_2$, $Bi_2Ru_2O_7$, C, $Ti_2N$, and $LaB_6$.

6. An electrical multilayer component comprising:
a basic body having at least one stack of dielectric layers and electrode layers arranged alternately one above another and an electrically non-connected shielding structure,
wherein the shielding structure is arranged between two of the electrode layers,
wherein the basic body has at least one resistance structure,
wherein the at least one resistance structure is arranged at a surface of the basic body, and
wherein the at least one resistance structure is provided with a passivation layer.

7. The electrical multilayer component as claimed in claim 6, wherein the at least one resistance structure is integrated in the basic body.

8. The electrical multilayer component as claimed in claim 6, wherein the shielding structure is arranged between the at least one resistance structure and a further resistance structure.

9. The electrical multilayer component as claimed in claim 6, wherein the at least one stack of dielectric layers and electrode layers comprises a plurality of stacks of dielectric layers and electrode layers, the stacks being arranged laterally alongside one another.

10. The electrical multilayer component as claimed in claim 6, wherein the shielding structure comprises a metallic layer.

11. The electrical multilayer component as claimed in claim 6, wherein the at least one resistance structure contains at least one material selected from the group consisting of $RbO_2$, $Bi_2Ru_2O_7$, C, $Ti_2N$, and $LaB_6$.

12. An electrical multilayer component comprising:
a basic body having at least one stack of dielectric layers and electrode layers arranged alternately one above another and an electrically non-connected shielding structure,
wherein the basic body has at least one resistance structure,
wherein the at least one resistance structure is arranged at a surface of the basic body,
wherein the shielding structure is arranged between the resistance structure and one of the electrode layers, and
wherein at least one multilayer capacitor is formed by the dielectric layers and the electrode layers stacked one above another.

13. The electrical multilayer component as claimed in claim 12, wherein the at least one stack of dielectric layers and electrode layers comprises a plurality of stacks of dielectric layers and electrode layers, the stacks being arranged laterally alongside one another.

14. The electrical multilayer component as claimed in claim 12, wherein the at least one resistance structure contains at least one material selected from the group consisting of: $RbO_2$, $Bi_2Ru_2O_7$, C, $Ti_2N$, and $LaB_6$.

15. An electrical multilayer component comprising:
a basic body having at least one stack of dielectric layers and electrode layers arranged alternately one above another and an electrically non-connected shielding structure,
wherein the basic body has at least one resistance structure,
wherein the at least one resistance structure is arranged at a surface of the basic body,
wherein the shielding structure is arranged between the resistance structure and one of the electrode layers, and
wherein at least one multilayer varistor is formed by the dielectric layers and the electrode layers stacked one above another.

16. The electrical multilayer component as claimed in claim 15, wherein the at least one stack of dielectric layers and electrode layers comprises a plurality of stacks of dielectric layers and electrode layers, the stacks being arranged laterally alongside one another.

17. The electrical multilayer component as claimed in claim 15, wherein the at least one resistance structure contains at least one material selected from the group consisting of: $RbO_2$, $Bi_2Ru_2O_7$, C, $Ti_2N$, and $LaB_6$.

18. An electrical multilayer component comprising:
a basic body having at least one stack of dielectric layers and electrode layers arranged alternately one above another and an electrically non-connected shielding structure,
wherein the basic body has at least one resistance structure,
wherein the at least one resistance structure is arranged at a surface of the basic body,
wherein the shielding structure is arranged between the resistance structure and one of the electrode layers, and
wherein at least one capacitance is produced by a pair formed by means of one of the dielectric layers and one of the electrode layers and interacts with the at least one resistance structure in order to form a low-pass filter.

19. The electrical multilayer component as claimed in claim 18, wherein the at least one stack of dielectric layers and electrode layers comprises a plurality of stacks of dielectric layers and electrode layers, the stacks being arranged laterally alongside one another.

20. The electrical multilayer component as claimed in claim 18, wherein the at least one resistance structure contains at least one material selected from the group consisting of: $RbO_2$, $Bi_2Ru_2O_7$, C, $Ti_2N$, and $LaB_6$.

* * * * *